United States Patent Office 3,070,588
Patented Dec. 25, 1962

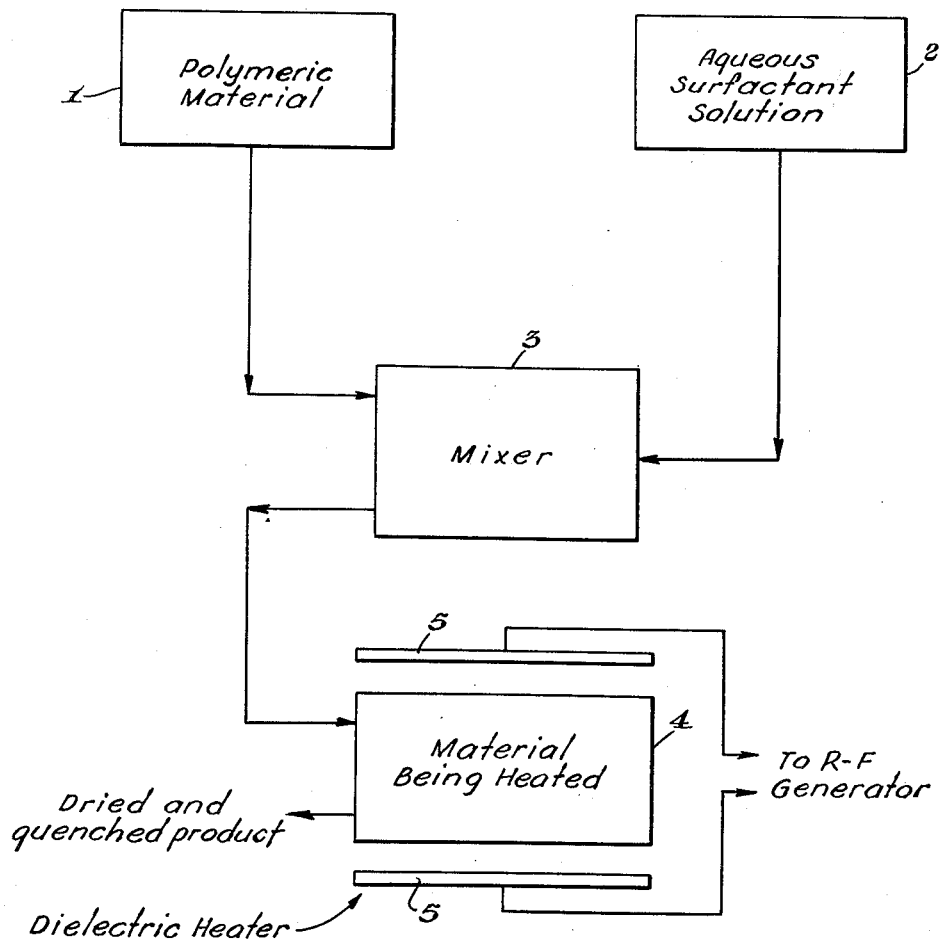

3,070,588
PROCESS FOR TREATING AND DRYING POLYMERIC SUBSTANCES
John D. Klink, Hemlock, and Frank H. Justin, Midland, Mich., assignors to The Dow Chemical Company, Midland, Mich., a corporation of Delaware
Filed Dec. 29, 1955, Ser. No. 556,283
5 Claims. (Cl. 260—94.9)

This invention relates to an improved process for treating and drying resins and polymeric materials. It has particular reference to a process for treating polymerized olefinic and other ethylenically unsaturated materials which have been prepared with catalytic metal compounds, to stabilize them against darkening and degradation, especially during subsequent forming and fabricating operations.

Many polymeric substances of varying origin may beneficially be treated for various purposes by the application of aqueous liquids followed by drying. In general, the process of the present invention is applicable for the treating and drying of any polymeric material. However, in view of the unique advantages and felicitous benefits which inhere, it will hereinafter be more particularly described and illustrated, by way of preference and convenience, with polymerized olefinic materials which have been prepared with catalytic metal compounds.

Various olefins and other ethylenically unsaturated materials, particularly ethylene, may be efficiently polymerized, even as relatively impurse materials, to high molecular weight polymeric compounds at comparatively low pressures and temperatures, according to a process first proposed by Karl Ziegler and his associates in Germany. In this process, mixtures of strong reducing agents, such as aluminum alkyls, with compounds of group IV-B, V-B and VI-B metals of the periodic system including thorium and uranium are employed as catalysts for the polymerization. Polyethylenes, for example, having average apparent molecular weights (as determined by such characteristics as their melt viscosities and the like) in excess of 40,000 and as large as 100,000 to 3,000,000 can be manufactured by polymerizing ethylene gas with such catalysts at temperatures beneath about 100° C. and under pressures less than about 100 atmospheres. It is preferable when employing such catalysts according to the Ziegler process to operate at temperatures of about 50° C. and under pressures between about 1 and 10 atmospheres. The reaction may suitably be conducted in the presence of an organic liquid medium such as hexane, benzene, saturated petroleum solvent fractions and the like.

The polyethylenes prepared by the Ziegler process have superior and highly desirable properties. For example, they may be made containing less than 3 and even less than 0.03 methyl groups per each 100 methylene groups in the polymer molecule. Their densities are usually at least in the range from 0.94–0.96 gram per cubic centimeter. The polymer molecules are practically completely linear and are crystalline almost to their melting points, which usually are in the neighborhood of about 125–135° C. They are insoluble in most solvents at ordinary temperatures. Shaped articles formed with such polyethylenes have tear strengths between about 1400 and 2800 pounds per square inch. Unstretched films prepared from them have tensile strengths in excess of about 2800 pounds per square inch and may be oriented by stretching to polyethylene film structures having tensile strengths as high as about 42,500 pounds per square inch.

The strong reducing agents which advantageously are employed in the catalyst mixtures of the Ziegler process include, among other compounds, a variety of aluminum trialkyls such as aluminum trimethyl, aluminum triethyl, aluminum tripropyl, aluminum triisobutyl and higher aluminum trialkyls as well as dialkyl aluminum halides, dialkyl aluminum hydrides, and dialkyl aluminum alkoxides. Salts of metals selected from the group consisting of titanium, zirconium, uranium, thorium and chromium are preferably employed as the group IV-B, V-B and VI-B metallic compounds in the catalyst, although salts of the remaining metals in these sub-groups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in the catalyst.

A particularly active catalyst mixture for the Ziegler process may be obtained by mixing a titanium or zirconium compound, such as a tetrachloride, oxychloride or acetyl acetonate with an aluminum trialkyl or a dialkyl aluminum compound. Generally, the molar quantities of the aluminum alkyl employed to constitute the catalyst admixture are two to three times the valence of the group IV-B, V-B and VI-B metal compound for each mole of the latter compound which is present, although many other ratios may also be employed satisfactorily. Amounts of the catalyst admixture varying from about 0.01 to a few percent by weight, depending on the degree of purity of the materials being polymerized, the desired rate of polymerization and the intended molecular weight, may suitably be employed.

After polymerization according to the Ziegler process, however, polyethylene and similar polymerized products contain residues from the admixed catalyst employed. The residues are not sufficiently removed by the conventionally utilized aftertreatment of polymeric materials prepared according to the Ziegler process. Such aftertreatment usually involves filtration, preferably in the presence of air (which tends to lighten the color of the product), to separate the polymerization product from the reaction mass. This may be followed by sequential trituration with hexane, isopropanol, water, acetone and pentane prior to drying. When higher catalyst concentrations are employed in the Ziegler process, some of the metallic compounds may be removed from the polymeric product by extracting it with methanolic hydrochloric acid then washing it in methanol or acetone. Butanol washings after the filtration in air have also been proposed to decompose and remove the catalyst residues.

It has been observed that the presence of metallic catalytic residues in polymeric materials prepared according to the Ziegler process tends to impart certain undesirable chracteristics to the polymers. For example, such polymers, when subsequently molded or otherwise shaped in the presence of heat tend to become darker than is desirable due to the presence of the catalyst residue. Such darkening seriously restricts the utility of polymers prepared according to the Ziegler process.

It would be advantageous, therefore, for a process to be available for treating and drying polyethylene and other polymers prepared according to the Ziegler process in such a manner that their tendency to darken or degrade upon being shaped, molded or otherwise formed into structures would be lessened or, for all practical purposes, eliminated. Water containing a dissolved surfactant material may be employed for this purpose according to the disclosure contained in the copending application of Charles R. Pfeifer and Richard O. Whipple, Serial No. 539,698, filed October 10, 1955, now Patent No. 2,967,857. It would be additionally advantageous, however, for such treatment to be available for attaining the desired result with utmost efficiency and dispatch in the preparation of a completely processed product. It would also be advantageous for a process to be available for the efficient treatment and drying of other polymeric materials whenever it may be beneficial to subject them to a treatment with an aqueous liquid.

These and other desiderata may be accomplished according to the process of the present invention by wetting a finely divided polymeric material with water containing a dissolved surfactant material; then dielectrically heating the wet polymeric material to dryness. Preferably, as has been indicated, the process is applied to the treatment and drying of polymerized olefinic and other ethylenically unsaturated materials, particularly polyethylene, prepared according to the herein described Ziegler process and containing residues from the catalyst. The process yields a dried product in which the consequences of having catalyst residues remaining in the polymerized product have been minimized or nullified. Such effect may be characterized as "quenching" or "killing" the catalyst.

By the process of the present invention, polymeric materials prepared pursuant to the Ziegler process may readily be brought to a dried and finished condition in which they may be molded, shaped or formed in any desired manner and in the presence of heat without tending to darken or discolor to an objectionable degree. The rapid effect of dielectric heating in drying such surfactant wetted polymeric materials substantially and beneficially augments and facilitates the quenching and polymer purifying action of the surfactant-containing water on the catalyst residue. This may be attributed to the violent and forceful vaporization which is uniformly and quickly obtained throughout the dielectrically heated material. In this connection, most polymeric materials wetted with surfactant-containing water have an improved response to being dried by dielectric heating in comparison to their behavior when they are wet with water alone.

The process may advantageously be conducted according to the schematic representation of the accompanying drawing. The polymeric material 1, which preferably, as mentioned, is a finely divided polymerized olefinic material containing a catalyst residue, is placed in a suitable mixer 3 wherein it is uniformly mixed with a solution 2 of water containing a dissolved surfactant material. The wetting should be accomplished in a manner to produce a homogeneous, free-flowing mass of wet polymer in which a separate liquid phase is not apparent. Advantageously, the solution which is usually employed for wetting the polymer is so prepared and proportioned as to provide not more than about 60 percent by weight of water in the wet polymer (taking into account that the polymer may already have some water included in it from other sources) and between about .03 and 5 and, more advantageously, between about 0.5 and 1 percent by weight of the surfactant material, based on the weight of the polymer and water which is present.

The wet polymer mixture is then placed as the material 4 being heated between the electrodes 5 of a dielectric heater, which is connected to a source of alternating electrical current of radio frequency, such as a conventional R-F generator (not shown). The catalyst residue is quenched by the aqueous surfactant solution while the polymer is being quickly and efficiently dried in the dielectric heater. After being dried, the polymer is directly ready for subsequent employment.

The dielectric heating apparatus which is employed in the process of the present invention may be operated in a conventional manner. Alternating currents having frequencies between about 2 and 1,000 megacycles may be employed although frequencies between about 6 and 100 megacycles are more commonly utilized. Any desired voltage may be used. Ordinarily it is preferable to employ voltages which are not in excess of about 25,000 volts. As is commonly understood, the heat liberated in a dielectric substance (such as a polymeric material) by a changing electric field depends on the dielectric loss factor of the particular substance being heated and is proportional to the frequency of the electrical supply and to the square of the impressed voltage. Hence the rate of drying may be governed by desired combinations of frequency and voltage with care being taken to avoid excessive potentials which may overstress and puncture the material being heated.

The process of the present invention is further illustrated by an example wherein relatively pure monomeric ethylene was polymerized according to the herein described Ziegler process using admixtures of aluminum triethyl and titanium tetrachloride as catalysts and conducting the reaction in hexane. The polyethylene was treated according to the usually practiced aftertreatment of the Ziegler process which consists of filtering the polymer from the reaction mass, then triturating in sequence with hexane, with isopropanol, with water, with acetone and with pentane prior to drying in a conventional manner. The polyethylene product, when molded, became discolored to a brownish color. This indicated that the catalyst residue had not been sufficiently inactivated or quenched for satisfactory utilization of the polymer in molding applications.

In contrast, an additional sample of the polyethylene was prepared by the same polymerization manner. However, before being dried, about 453 grams of the crude polymer, which contained about 30 to 50 percent by weight of moisture, was thoroughly mixed with a solution of about 3.6 grams of an octyl benzene polyether alcohol detergent (such as is available under the tradename "Triton X-100" from Rohm & Haas Company) in about 18 grams of water. The detergent solution was heated to a temperature of about 100° C. for purposes of more efficient dispersion, before being incorporated in the polymer. The wet mixture was then placed in about a two inch layer between the electrodes of a conventional dielectric heating apparatus which were maintained in a heated compartment and were spaced about two and one-half inches apart. The heater was operated at a frequency of about 16 megacycles under an impressed voltage of about 8,000 volts. At the end of a four minute heating period the temperature of the polyethylene being dried was about 110° C. The dried polymer was found to have a moisture content of about 0.03 percent by weight. After being so treated and dried, the polyethylene molded to attractive white specimens which did not show evidences of discoloration.

A similar polyethylene sample having about the same amount of water but no surfactant incorporated in the wet mixed state was dried under the same conditions in the dielectric heater. At the end of the four minute heating period, the temperature of the polymer was found to have risen only to about 80° C. The moisture content of the dried polymer was so high that it could not be extruded without an intolerable formation of bubbles due to the excessive presence of water and consequent formation of water vapor.

Analogous excellent drying results may be obtained using dielectric heating with similar surfactant-wet mixtures of such polymeric materials as polyvinyl chloride; polyvinylidenechloride, other types of polyethylene, polystyrene, polyamides such as nylon, polytetrafluoroethylene, and polyesters of ethylene glycol and terephthalic acid.

Various surfactant materials may be employed with water in practicing the process of the present invention. Although any type of surfactant may advantageously be utilized, nonionic materials may frequently be employed with more favorable results on catalyst residue-containing polyolefins. Examples of suitable surface active agents include certain of the polyglycol ether compounds; aryl polyether alcohols; alkylated aryl polyether alcohols; polyoxyethylated propylene glycols; polyoxypropylated ethylene glycols; diesters of sodium sulfosuccinic acid; arylnaphthalene sodium sulfonates; sodium hexametaphosphates; neutral salts of ethylene diamine tetraacetic; dodecylamine acetates; and other like or equivalent surfactants. It is to be noted that all of the mentioned varieties of surfactants are the so-called synthetic detergent types of materials.

Since certain changes and modifications can readily be entered into in the pratice of the present invention without substantially departing from its spirit and scope it is to be fully understood that all the foregoing description and specification be interpreted as being merely illustrative of the invention and should not be construed as being restrictive thereof excepting as it is set forth and defined in the appended claims.

What is claimed is:

1. Process for treating polymerized olefinic materials prepared with a catalyst formed by admixing a strong reducing agent with compounds of the group IV–B, V–B and VI–B metals of the Mendeléeff Periodic System and containing catalyst residues after having been polymerized which comprises uniformly mixing and wetting the catalyst residue-containing polymerized product with water containing a dissolved synthetic detergent surfactant material to produce a homogeneous, free-flowing mixture; then dielectrically heating the wet polymeric product to dryness.

2. Process for treating polymerized olefinic materials prepared with a catalyst formed by admixing a strong reducing agent with compounds of the group IV–B, V–B, and VI–B metals of the Mendeléeff Periodic System and containing catalyst residues after having been polymerized which comprises uniformly mixing and wetting the catalyst residue-containing polymerized product with an amount of water containing a dissolved synthetic detergent surfactant material proportioned so as to produce a homogenous, free-flowing mixture containing between about 0.3 and 5 percent by weight of the surfactant material, based on the weight of the polymerized product and water in the mixture; then dielectrically heating the wet polymeric product to dryness.

3. The process of claim 2 wherein the amount of water containing a dissolved surfactant material and the amount of dissolved surfactant material is proportioned to produce a homogenous, free-flowing mixture containing between about 0.5 and 1 percent by weight of the surfactant material, based on the weight of the polymerized product and water in the mixture.

4. The process of claim 2 wherein the polymerized product is polyethylene.

5. The process of claim 2 wherein the polymerized product is polyethylene prepared by polymerizing ethylene in the presence of a catalyst formed by admixing an aluminum alkyl with titanium tetrachloride.

References Cited in the file of this patent

UNITED STATES PATENTS

| | | |
|---|---|---|
| 2,580,315 | Park | Dec. 25, 1951 |
| 2,624,724 | Park | Jan. 6, 1953 |
| 2,628,214 | Pinkney et al. | Feb. 10, 1953 |
| 2,721,189 | Anderson et al. | Oct. 18, 1955 |
| 2,728,753 | Russum et al. | Dec. 27, 1955 |
| 2,838,477 | Roelen et al. | June 10, 1958 |
| 2,843,577 | Friedlander et al. | July 15, 1958 |
| 2,850,490 | Canterino et al. | Sept. 2, 1958 |
| 2,870,113 | Jones | Jan. 20, 1959 |

FOREIGN PATENTS

| | | |
|---|---|---|
| 533,362 | Belgium | May 15, 1955 |

OTHER REFERENCES

"Chemical Engineers Handbook" (Perry), published by McGraw-Hill (New York), 1950, pages 815, 870.